United States Patent
McClinton

[15] 3,703,904
[45] Nov. 28, 1972

[54] SAFETY PACK-OFF FOR WELLS
[72] Inventor: John McClinton, 8603 Glenaire, Houston, Tex. 77017
[22] Filed: Sept. 7, 1971
[21] Appl. No.: 178,068

[52] U.S. Cl.....................................137/504, 138/43
[51] Int. Cl.................................................F16k 31/00
[58] Field of Search........166/53, 121, 179, 202, 212; 138/43, 46; 251/191; 277/263, 167; 137/504

[56] References Cited

UNITED STATES PATENTS

| | | |
|---|---|---|
| 1,079,985 | 12/1913 | Kaminsky..................137/504 |
| 2,829,674 | 4/1958 | Segelhorst et al......137/504 X |
| 3,151,628 | 10/1964 | Heckert..................137/504 X |

*Primary Examiner*—Henry T. Klinksiek
*Attorney*—R. Werlin

[57] ABSTRACT

A safety pack-off operable to seal off the annular spaces between concentric pipe strings in oil and gas wells automatically in response to excessive fluid flows upwardly through the annular spaces.

4 Claims, 3 Drawing Figures

PATENTED NOV 28 1972
3,703,904
Fig. 1
Fig. 3
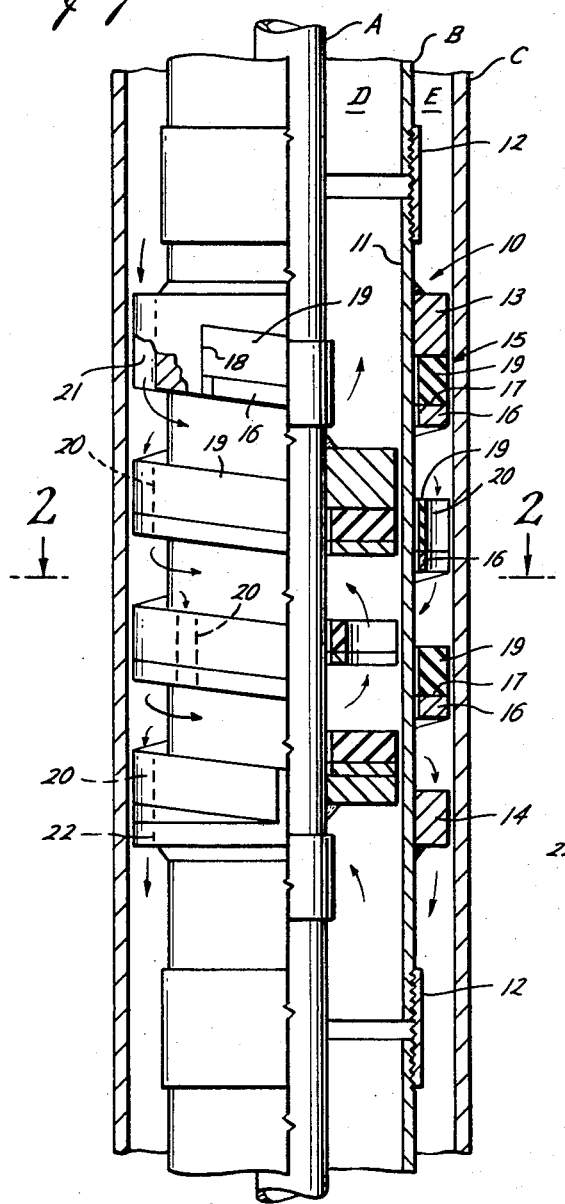
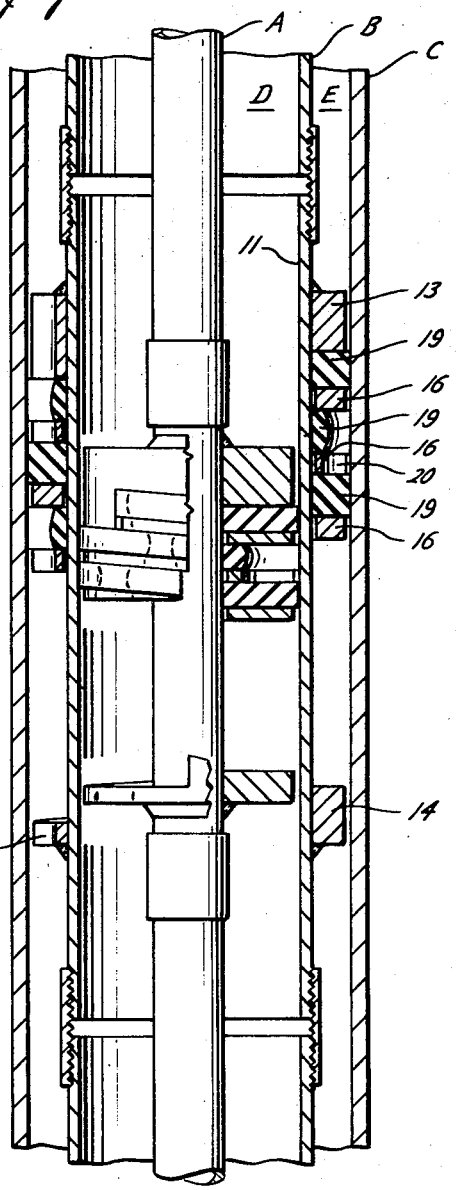
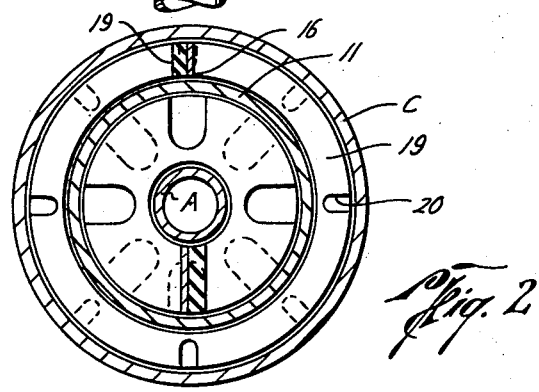
Fig. 2
John McClinton
INVENTOR.
BY
ATTORNEY

SAFETY PACK-OFF FOR WELLS

BACKGROUND OF THE INVENTION

In the drilling and production of oil and gas wells, the wells are conventionally equipped with several strings of concentric casing extending to varying depths in the well. One or more of these pipe strings will commonly extend through several vertically spaced, fluid-containing earth formations such as oil- and gas-containing formations. Ordinarily, various types of sealing elements are positioned along the pipe strings to seal off the annular spaces in such a way as to separate the fluid-containing formations from one another and to limit communication between each of the pipe strings with a particular earth formation.

Frequently, due to some failure in the seals, the well head fittings, or in the pipe strings themselves, leakage will occur to a degree sufficient to release the full pressure flow of fluid from a formation into the annular space between the pipe strings resulting in so-called "blowouts", which can result in severe damage and even loss of a well.

The present invention is directed to a device forming a pack-off between the pipe strings which will be automatically operative in response to a sudden flow of fluid to effect automatic seal-off of the annular space between the pipe strings involved.

DESCRIPTION OF THE INVENTION

Generally speaking, the safety pack-off, in accordance with this invention, comprises a coil spring-like body which is concentrically mounted in the annular space between two pipe strings having its upper end fixedly secured to the inner one of the pipe strings and its lower end free for movement as the spring-like body is collapsed or relaxed. One face of the body is lined throughout its length with a gasket comprised of a flexible resilient material, such as a synthetic rubber or plastic material. A plurality of angularly-spaced openings extend vertically through the spring-like body and the gasket to serve as fluid flow passages. The gasket material is adapted in response to collapse on compression of the spring-like body to seal off the openings and the annulus between the pipe strings when the rate of fluid flow upward through the annulus exceeds the capacity of the openings thereby providing an automatic shut-off of the annulus while such excessive flow persists.

Other and more specific objects and advantages of this invention will become more readily apparent from the following detailed description when read in conjunction with the accompanying drawing which illustrates one useful embodiment in accordance with this invention.

In the drawing:

FIG. 1 is a longitudinal, partly-sectional view of a number of concentric pipe strings showing two pack-off devices in accordance with this invention disposed in the annular spaces between the several pipe strings, the pack-off devices being shown in their relaxed condition;

FIG. 2 is a cross-sectional view taken on line 2—2 of FIG. 1; and

FIG. 3 is a view similar to FIG. 1 showing the pack-off devices in collapsed condition.

Referring to the drawing, there is illustrated a generally conventional oil or gas well installation comprising three concentric strings of pipe which include a relatively small diameter inner pipe string A, an intermediate somewhat larger diameter pipe string B, and an outer still larger diameter pipe string C, the annulus defined between pipe strings A and B being designated by the letter D and that between pipe strings B and C by the letter E.

A safety pack-off in accordance with this invention is shown mounted in each annulus and as they are identical except for differences in dimensions necessary to accommodate each to its respective annulus, it will be understood that a description of the form and function of either one will serve to describe the present invention.

The pack-off mounted in outer annulus E is designated generally by the numeral 10 and comprises a tubular mandrel 11 which may suitably consist of a section of pipe string B being connectible therein by conventional screw couplings 12—12 by which the opposite ends of the mandrel may be secured to adjacent sections of the pipe string. Annular upper and lower end plates 13 and 14, respectively, are fixedly secured to the exterior of mandrel 11 in longitudinally spaced-apart relation to provide space for reception of the helical seal element, designated generally by the numeral 15, which surrounds mandrel 11.

The seal element 15 comprises a metallic body 16 in the form of a coil spring, which may be of any suitable cross-sectional shape, but preferably having a flat upper face 17. The upper end of spring body 16 is fixedly secured, as by welding, to the wall of a notch 18 provided in upper end plate 13. Upper face 17 of the coil spring is lined throughout its length with a gasket 19 of substantial thickness and constructed of any suitable and conventional flexible, resilient rubber-like or plastic composition which is oil-resistant and which is securely adhered to the spring. The radial thickness of gasket 19 will generally be such as to provide a small amount of clearance relative to the surrounding walls of pipes B and C when the pack-off element is in the relaxed condition, seen in FIG. 1, but which, when the pack-off element is in the collapsed or compressed condition, seen in FIG. 3, will expand radially into tight sealing engagement with the surrounding pipe walls.

A plurality of vertical passages 20 are provided in angularly spaced relation through body 16 and gasket 19 along the length thereof and similar passages 21 and 22 are provided through end plates 13 and 14, respectively. As illustrated, passages 20 are shown to be in the form of radial slots opening to the outer peripheries of spring 16 and gasket 19. However, it will be understood that these passages may have other shapes and may be of round or other shape suitable for passage of fluid therethrough.

In operation, the pack-off will be installed by mounting it in pipe string B at a point which will place it preferably near the top of the well. With the pack-off in the relaxed position, shown in FIG. 1, any well fluids flowing upwardly through annulus E at a low or controlled rate will move through passages 20 without hindrance. However, should there occur a sudden flow of fluid at a high rate through the annulus, as a result, for example, of the breakage of a control fitting at the surface, the passages 20 will act as chokes or flow restrictions which will produce collapse of the pack-off element pressing the coils together as seen in FIG. 3. By reason of the staggered arrangement of passages 20, the compression of gasket 19 between the spring coils will act to seal off passages 20 while at the same time the axial compression of the gasket will expand the latter radially into tight sealing engagement with the surrounding walls of pipe strings B and C, thereby forming a complete shutoff between those pipe strings and preventing further escape of well fluids.

The shut-off will persist so long as the excessive fluid flow continues from below. As soon as the flow is reduced sufficiently, the coil spring will relax, re-opening fluid communication through the annulus. The pack-off element may be forcibly expanded, if desired, by pumping fluid into the annulus from above (arrows in annulus E) in sufficient volume and pressure to exceed that in the upward flowing fluid. Thus, weighted mud fluid, for example, could be pumped into annulus E to overcome the pressure from below and thus "kill" the well, if desired.

As noted previously, a similar pack-off unit may be installed in annulus D to provide the same type of protection against blowouts through the latter annulus.

The safety pack-off device heretofore described will provide automatic shut-off which will be effective to prevent blowouts and so-called "wild wells", which have caused great damage and loss of life in the petroleum industry.

The pack-off mounted in annulus D between pipe strings A and B is, as noted previously, identical in form and function to pack-off 10, differing therefrom only in dimensions as determined by the difference in width of annulus D, as compared with that of annulus E. While not essential that each annulus be protected by a separate pack-off unit, such an arrangement is generally desirable as a safety precaution.

It will be understood that various changes and modifications may be made in the details of the illustrative embodiments within the scope of the appended claims but without departing from the spirit of this invention.

What I claim and desire to secure by Letters Patent is:

1. A safety pack-off for controlling fluid flow between two concentric pipe strings in a well, comprising:
  a. a coil spring-like body concentrically disposed in the annulus between the pipe strings having its upper end fixedly secured to the inner one of said pipe strings and its lower end free;
  b. a gasket constructed of resilient composition material lining one face of said body throughout its length.
  c. a plurality of angularly spaced passages perforating said body and gasket operable to produce collapse of said body and sealing of said passages and said annulus by said gasket in response to upward flow of fluid through said annulus at a rate exceeding the flow capacity of said passages.

2. A safety pack-off according to claim 1 wherein said passages comprise radial slots opening to the outer peripheries of said body and gasket.

3. A safety pack-off for controlling fluid flow between two concentric pipe strings in a well, comprising:
  a. a tubular mandrel adapted to form a section of the inner pipe string;
  b. a coil spring-like body concentrically disposed in the annulus between the pipe strings having its upper end fixedly secured to said mandrel and its lower end free;
  c. a gasket constructed of resilient composition material lining one face of said body throughout its length;
  d. a plurality of angularly spaced passages perforating said body and gasket operable to produce collapse of said body and sealing of said passages and said annulus by said gasket in response to upward flow of fluid through said annulus at a rate exceeding the flow capacity of said passages.

4. A safety pack-off according to claim 3 including longitudinally spaced annular end plates secured to the exterior of said mandrel, the upper end of said body being secured to the upper one of said end plates.

* * * * *